Figure 1:
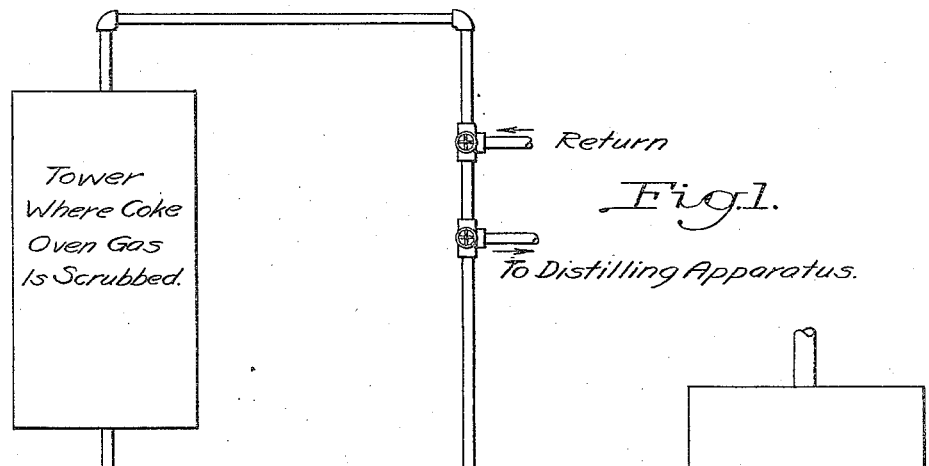

Sept. 20, 1932.                M. SHOELD                 1,878,607

PROCESS FOR REMOVING ONE OR MORE VOLATILE CONSTITUENTS FROM A LIQUID OR GAS

Filed Jan. 20, 1931          2 Sheets-Sheet 2

INVENTOR
Mark Shoeld

Patented Sept. 20, 1932

1,878,607

UNITED STATES PATENT OFFICE

MARK SHOELD, OF MOUNT LEBANON, PENNSYLVANIA, ASSIGNOR TO THE KOPPERS COMPANY, OF DELAWARE, A CORPORATION OF DELAWARE

PROCESS FOR REMOVING ONE OR MORE VOLATILE CONSTITUENTS FROM A LIQUID OR GAS

Application filed January 20, 1931. Serial No. 509,944.

My invention relates to the removal of the most volatile constituents or a plurality of the more volatile constituents from a liquid containing a plurality of volatile constituents. My invention further relates to the removal of such constituents from a gas. I have discovered that this may be accomplished without raising the temperature of the liquid or gas above room temperature at any stage in the process. I have, furthermore, discovered that it is possible to remove such volatile constituent or constituents without losing any substantial amount of any of the other volatile constituents from the liquid. My process is of particular importance in connection with the scrubbing of fuel gas; and in a more restricted aspect therefore, my invention relates to the removal of vapors from fuel gas with a liquid cyclically circulated, the subsequent convective fractionation of the liquid at ordinary temperatures or constant temperature to obtain a separation of the more volatile fraction of the constituents absorbed from the fuel gas, and the removal of the remaining or less volatile fraction from the gas employed in the convective fractionation.

It is well known that in the operation of coke ovens to produce coke and fuel gas, carbon bisulphide, benzol, toluol and solvent naphtha, which is principally xylol, are generated and are contained in the fuel gas as it comes from the coke oven. If the fuel gas coming from the coke oven is passed through a scrubbing tower and treated with a wash oil, these volatile constituents of the fuel gas are scrubbed out of the gas and taken off by the wash oil. My process makes it possible to remove the most volatile of these constituents, which is the carbon bisulphide, without losing any of the other constituents, such as the benzol, the toluol and the solvent naphtha.

Accordingly, one object of my invention is to treat with a gas a liquid containing a plurality of volatile constituents according to a process which removes the most volatile constituents or a plurality of the more volatile constituents without necessitating the heating of the liquid or gas above room temperature.

A further object of my invention is to treat a liquid containing such constituents and remove the most volatile without loss of any of the other volatile constituents from the liquid.

Another object of my invention is to scrub vapors from fuel gas with a wash oil, and remove the more volatile fraction of the vapors from the wash oil without loss of the less volatile fraction, the less volatile fraction being eventually left in the wash oil, or otherwise recovered.

A further and more specific object of my invention is to remove carbon bisulphide from wash oil by a process which does not involve the loss of any substantial portion of the other volatile ingredients from the wash oil.

A further object of my invention is to remove the least volatile constituent or a plurality of the less volatile constituents from a gas, leaving the more volatile constituents in the gas.

Figure 2:
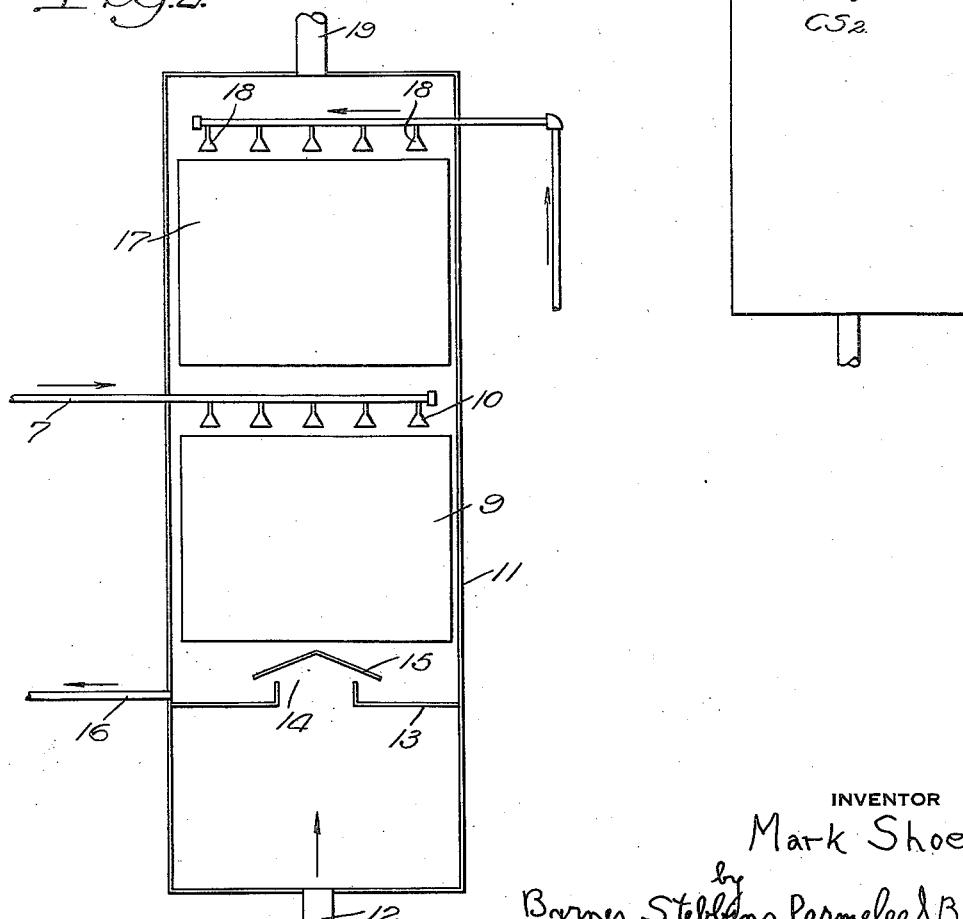

In the drawings, which are merely illustrative and are not intended as limiting my invention;

Figure 1 is a diagram showing the circulation of the wash oil between the tower where the coke oven gas is scrubbed and the apparatus for removing the $CS_2$, Figure 2 is a diagrammatic view in vertical section of a simple apparatus for employing the broad principle of my invention, Figure 3 is a diagram of apparatus for removing carbon bisulphide from wash oil without removing the benzol, toluol or solvent naphtha, and Figure 4 is a diagrammatic view in vertical section of apparatus corresponding to the diagram shown in Figure 3.

Figure 1 is a diagram showing the circulation of the wash oil in a plant for scrubbing coke oven gas. The type of tower employed for scrubbing the coke oven gas as it comes from the oven is not indicated in this diagram, since there are several well known types of scrubbers which are employed for this purpose. The wash oil absorbs from the coke oven gas such constituents as carbon bisulphide, benzol, toluol and solvent naphtha. The wash oil containing these constituents is then passed to the apparatus for removing the carbon bisulphide which will be later described. None of the other volatile constituents are removed from the wash oil in this apparatus. The wash oil may then be passed through distilling apparatus so as to take out one or all of the remaining volatile constituents. This, however, is optional. In its broadest aspects, my invention is concerned with removing the most volatile or a plurality of the more volatile constituents from a gas, such as the fuel gas being scrubbed, or a liquid (of which the wash oil used for scrubbing is an example) containing a plurality of volatile constituents.

It should be noted, in connection with the diagram of Figure 1, that where there is a demand for fuel gas which is free from carbon bisulphide, the wash oil may be circulated from the scrubbing tower to the apparatus for removing the carbon bisulphide and back again, thus keeping the same concentration of the volatile constituents other than the carbon bisulphide in the wash oil at all times; and, accordingly, none of these other constituents will be removed from the fuel gas by the wash oil. On the other hand, if the fuel gas is to be used purely as a heating fuel, the wash oil, after being passed through the apparatus for removing the carbon bisulphide, may be distilled so that the light oil is recovered.

In Figure 2, I have illustrated diagrammatically simple apparatus for carrying out my process. It is to be understood that my invention is broadly applicable to the removal of a fraction made up of the most volatile constituent or a plurality of the more volatile constituents from a liquid containing a plurality of volatile constituents; but in order to simplify the description of the process which constitutes my invention, I will describe the same in connection with the removal of carbon bisulphide from wash oil.

The principle of counter-current treatment of a liquid by a gas is made use of in my process. If suitable hurdles or other extensive surfaces are employed to permit the liquid to trickle down over these extensive surfaces, and the gas is passed up through the hurdles or contact surfaces, the gas, if sufficient in volume, will take out all of the volatile constituents from the liquid. This is known as convective distillation.

The theory of the counter-current treatment of a liquid by a gas is that at any stage of the counter-current treatment, the vapor pressure of a volatile constituent will tend to come to a balance with the concentration of this volatile constituent in the liquid. At the top of the tower or other apparatus of this type, the concentration in the liquid of the volatile constituent is the greatest; and, according, the vapor pressure at the top of the tower of this volatile constituent is the greatest of any portion of the tower. If sufficient gas is employed, however, the latter will not be fully saturated at intermediate stages, since as the liquid passes downwardly over the extensive surfaces, it loses more and more of the volatile constituent because it is coming in contact with gas which has less and less of the vapor in it. At the bottom of the tower, the concentration of the volatile constituent in the liquid approaches zero, while the gas is substantially free from the volatile constituent and, therefore, exerts its most powerful absorbing action on the liquid. This counter-current principle is well known; and will be clearly understood by those skilled in the art, the particular apparatus best suited to carry out this principle in each case being a matter for their judgment.

The counter-current principle applies equally well when gas laden with the vapor of a volatile constituent is to be treated with a liquid which is free from the volatile constituent in question. This is known as scrubbing. In this case, the gas comes into the bottom of the tower laden with the volatile constituent and gradually gives up this vapor to the liquid as it passes upwardly over the extensive surfaces. As the gas nears the top of the tower, it is coming in contact with liquid which has less and less of the volatile constituent contained therein, and which accordingly has greater and greater powers of absorbing the volatile constituent from the gas.

In Figure 2, I have illustrated how the counter-current principle discussed above may be used for transferring a plurality of volatile constituents from a liquid to a gas which is used for treating the same; and how this gas may thereupon be treated with a liquid free from the volatile constituent or constituents which are to be retained, so as to reabsorb the same, while a fraction made up of the most volatile constituent or a plurality of the more volatile constituents is allowed to pass off with the gas. The liquid such as a wash oil enters by way of the pipe 7, as indicated by the arrow. This liquid is sprayed over hurdles 9 by means of sprays 10, the hurdles 9 and the sprays 10 being enclosed within a tower 11. Air is introduced into the bottom of the tower 11 through an inlet pipe 12. The liquid as it drips from the hurdles 11 is caught by a sump 13, through which extends a passage 14 for the upwardly flowing gas. A cover or baffle 15 prevents the drippings from falling through the opening 14, while permitting the gas to enter the chamber of the tower in which the hurdles 9 are contained. An outlet pipe 16 permits the wash oil caught in the sump 13 to flow outwardly as indicated by the arrow, so as to flow back or be pumped back through the system shown in Figure 1. Sufficient gas, such as air must be passed upwardly through the tower to remove all of the most volatile constituent (such as carbon bisulphide) from the liquid. It should be noted that not only is enough gas required to treat the liquid coming in through the pipe 7, but also the liquid which, as is about to be described, is used for treating the gas which has passed through the hurdles 9.

The air which has passed through the hurdles 9 has taken out substantially all of the carbon bisulphide from the liquid, such as the wash oil; since the hurdles are arranged to operate in accordance with the counter-current principle. Above the hurdles 9 and within the tower 11 is a second set of hurdles 17 through which the gas laden with the vapors of the volatile constituents of the wash oil is passed. A liquid free from the volatile constituents which are to be retained is sprayed over the hurdles 17 by sprays 18. In accordance with the counter-current principle, the volatile constituents in the gas are absorbed by this liquid to the extent of its power to absorb the same. If sufficient liquid is sprayed over the hurdles 17, all of the volatile constituents, including the most volatile such as carbon bisulphide, will be reabsorbed. It is an essential feature of my invention that the liquid sprayed over the hurdles 17 be limited in quantity so as not to absorb all of the fraction made up of the volatile constituent or constituents which are to be removed, while absorbing all or substantially all of the fraction made up of the volatile constituent or constituents which are to be retained. It is a simple matter to calculate from the known absorption characteristics of liquids how much liquid should be sprayed over the hurdles 17.

This liquid passes down over the hurdles 17; and if desired, it may be caught by a sump similar to the sump 13 and withdrawn from the tower 11. It may be used, after having the volatile constituents distilled out of the same; or it may be freed from the volatile constituents, and returned to the sprays 18. However, in the particular embodiment of the apparatus shown in Figure 2, the liquid sprayed over the hurdles 17 is preferably of such a type that it can be used to advantage by mixing it with the liquid sprayed over the hurdles 9. Accordingly, after trickling down over the hurdles 17, it passes down over the hurdles 9 and is caught in the sump 13. When wash oil is being treated in accordance with my process, the liquid sprayed over the hurdles 17 may be wash oil which has been distilled to remove the volatile constituents. The gas, which is free from all of the volatile constituents except the most volatile or the more volatile, now passes out through the vent 19. The carbon bisulphide may be recovered from the gas, or may be allowed to waste.

It will be noted that it is not necessary to use burners or the like in order to heat up either the incoming air or the liquid which contains the volatile constituents. The gas first takes up volatile constituents from the liquid, and then gives up all of these volatile constituents except the most volatile or the more volatile as it passes up over the hurdles 17. Accordingly, it is possible to remove the fraction made up of the most volatile constituent or the more volatile constituents from a liquid such as wash oil, without the use of heat and without losing the less volatile constituents.

A more efficient process is provided if the same gas which is used to treat the wash oil trickling down over the hurdles 9 is first used to remove volatile constituents from the liquid which is to be used in the sprays 18. This may be accomplished by inserting in the chamber below the sump 13, a set of hurdles, and if a portion of the liquid drawn off through the pipe 16 is sprayed over these hurdles, the liquid thus freed from the less volatile fraction may be caught and pumped up to the sprays 18. It will be noted that this arrangement has the advantage that the air passing through the opening 14 is already laden to a greater or less extent with vapors of the volatile constituent or constituents which are to be left in the wash oil. The air passing through the opening 14 does not, therefore, remove so much if any of the same from the wash oil trickling down over the hurdles 9. Moreover, the process is made more nearly self-contained, since the amount of liquid in the system will be substantially constant. The portion of the liquid passing around through the lower chamber and up to the sprays 18 is kept flowing at a substantially constant rate, the remainder of the liquid coming in through the pipe 7 and back out through the pipe 16.

The apparatus illustrated in Figure 2 takes care of the simple problem of removing a plurality of volatile constituents from a liquid by convective distillation and scrubbing the air or other gas which has been used for the convective distillation, so as to recover the fraction made up of the least volatile or a plurality of the less volatile constituents, while leaving in the gas the fraction made up of the most volatile or a plurality of the more volatile constituents. My invention provides, according to a more specific aspect of the same, for removing the most volatile or a plurality of the more volatile constituents from a liquid containing these constituents by subjecting the liquid to convective distillation by a gas (similarly as in the simple apparatus above described), and recovering volatile constituents from the gas after it has been employed for the convective distillation by successively scrubbing the gas with regulated quantities of wash liquid, the successive quantities being substantially free progressively from the volatile constituents which are to remain. If the liquid which is to be subjected to convective distillation by a gas contains several volatile constituents, no two of which are equally volatile from wash oil, it is preferable to scrub the gas which has been used for the convective distillation in a plurality of stages, one for each of the volatile constituents which is to be recovered. The least volatile will require the smallest amount of wash oil for the scrubbing of the same out of the gas. This small amount of wash oil will be augmented and the larger quantity of wash oil used to scrub out the next more volatile constituent. For the next more volatile constituent, the quantity of wash oil is again augmented, and scrubbing may thus be carried on progressively until all of the volatile constituents are provided for. In practice, it is found best to treat the gas first with the largest quantity of wash oil and last with the smallest quantity of wash oil. Inasmuch as the gas is flowing in counter-current to the wash oil, this simplifies the arrangement of scrubbing means, as will be made clear from the following explanation of how carbon bisulphide may be removed from wash oil which has been used to scrub "coke oven gas."

In wash oil which has been used to scrub coke oven gas, more than two volatile constituents are involved; and in Figures 3 and 4, I illustrate how, by using slightly more complicated apparatus, the carbon bisulphide may be removed without losing any of the other volatile constituents which make up the light oil. Any fuel gas containing $CS_2$ gas will require 28.6 gallons of wash oil per 1000 cu. ft. to remove all the $CS_2$, contained therein. The same gas will require 10.4 gallons to remove all the benzol, 4.0 gallons to remove all the toluol and 1 gallon to remove the solvent naphtha. As it is the purpose of this invention to remove the $CS_2$, it will be necessary to scrub the fuel gas with 28.6 gallons of wash oil. Now, to take out these various constituents from 28.6 gallons of wash oil, the following volumes of air are required:

1 M cu. ft. to remove the carbon bisulphide
2.75 M cu. ft. to remove the benzol
7.15 M cu. ft. to remove the toluol
28.6 M cu. ft. to remove the solvent naphtha As it is the purpose of the process to remove only the carbon bisulphide from the wash oil, the amount of air necessary to remove the same is 1000 cu. ft.

As has been indicated above, 28.6 gallons of wash oil are required for each 1000 cu. ft. of fuel gas in order to remove all of the $CS_2$.

The quantity of air to be used must not only take out all the $CS_2$ from the wash oil used to treat 1 M cu. ft. of gas (or 28.6 gals.), but, in addition to this, must also treat sufficient wash oil in the compartment below the middle to free it of benzol so that it may absorb all the benzol from the air when recirculated over the compartment just above the center compartment. This also holds true for the treatment of the wash oil in the second and third compartments below the center, which must be freed of toluol and solvent naptha respectively; so that this wash oil, when recirculated over the second and third compartments, respectively, above the middle compartment, will absorb all of these constituents from the air passing through these compartments.

Thus, the amount of wash oil that has to be freed of $CS_2$ will be $28.6+x$ gals. The amount of air required for this is $$\frac{28.6+x}{28.6} \text{ M cu. ft. air}$$

In addition, this amount of air must free $x$ gals. of wash oil from benzol. This amount of air is accordingly $$\frac{x}{10.4} \text{ M cu. ft.}$$

we, therefore, have the equation $$\frac{28.6+x}{28.6}=\frac{x}{10.4}$$

$$x=16.4$$

Thus the total amount of oil to be treated in the middle compartment is $28.6+16.4=45$ gals. The quantity of air required is, therefore, 1.575 M cu. ft. of air As is shown in Figure 3, 28.6 gallons of wash oil containing all of the carbon bisulphide and light oil from 1 M cubic feet of coke oven gas enter the middle compartment of the apparatus (later to be described). In this compartment, the wash oil is treated with air in accordance with the counter-current principle. 28.6 gallons of wash oil are taken out of the lower part of the middle compartment; so that the amount of liquid in the system is the same at all times except for incidental losses which, of course, must be replaced. It will be noted that in the apparatus itself which is used for removing the carbon bisulphide, there is sufficient liquid so that 16.4 gallons of liquid or wash oil pass through the middle compartment with the 28.6 gallons which are being treated. In the compartment below the middle compartment, the 16.4 gallons of liquid which are constantly circulated through the apparatus come in contact with the upwardly flowing air in accordance with the counter-current principle and the air absorbs volatile constituents therefrom. Since 1.575 M cubic feet of air are flowing through the apparatus and only 16.4 gallons of liquid are being treated in this compartment, all the benzol is taken out of the 16.4 gallons of liquid. Of this 16.4 gallons, 10.1 are removed and the remaining 6.3 pass into the next lower compartment. Here the 6.3 gallons are treated according to the counter-current principle whereby substantially all of the toluol is removed from this oil, and 4.7 gallons are removed. The remaining 1.6 gallons of wash oil is treated in the lower-most compartment with the 1.575 M cubic feet of air whereby substantially all of the solvent naphtha is removed from this 1.6 gallons.

The quantities of wash oil required are thus calculated from the volatility of the different constituents of the wash oil; so that when these quantities are circulated in the apparatus in the manner indicated in Figure 3, all of the volatile constituents of the wash oil, except the carbon bisulphide will be reabsorbed in the upper sections.

It will be noted that the volatile constituents which are taken out of these different quantities of wash oil pass upwardly to the central compartment; and, therefore, the air entering the central compartment is charged to a certain extent with the vapors of these constituents, so that there is substantially no tendency for the air to remove these less volatile constituents from the 45 gallons of wash oil in the central compartment. In other words, for a given concentration of benzol, toluol etc., there is a corresponding vapor pressure of each whenever equilibrium exists, and these respective vapor pressures are already present in the air when it enters the central compartment. The 10.1 gallons which have been freed from benzol are passed into the compartment next above the central compartment and used to reabsorb all of the benzol with which the air coming from the central compartment is laden. The quantity introduced into this compartment is calculated so as to be just enough to completely free 1.575 M. cubic feet of air of benzol. In the compartment next above, the 4.7 gallons of wash oil free from both benzol and toluol is sprayed. Into the top compartment is sprayed the 1.6 gallons of wash oil which is free from solvent naphtha, benzol and toluol. It will be noted, therefore, that 16.4 gallons of wash oil, the sum of 10.1 gallons, 4.7 gallons and 1.6 gallons flows through the compartment next above the middle compartment. This quantity is just sufficient to reabsorb all of the benzol with which the 1.575 M cubic feet of air is laden. 6.3 gallons flows through the next higher compartment which is sufficient to remove all of the toluol. The 1.6 gallons which flow through the top compartment are sufficient to take out all of the toluol. Accordingly, the air flowing out of the apparatus contains no benzol, no toluol and no solvent naphtha. The sum of the quantities of wash oil, which are constantly circulated to the upper compartments of the apparatus is not sufficient, however, to remove all of the carbon bisulphide (which is the most volatile constituent) out of the air and, accordingly, the carbon bisulphide passes out of the apparatus with the air.

It will be understood from the principles of my invention above set forth that both the benzol and the $CS_2$ may be left in the gas issuing from the apparatus. In this modification of the process, the compartment on each side of the middle compartment would be omitted, and the amount of wash-oil continuously circulated in the apparatus would be calculated in the above indicated manner for toluol instead of benzol, viz:

$$\frac{28.6+x}{28.6}=\frac{x}{4} \text{ or } x=4.65$$

Figure 4 illustrates diagrammatically how apparatus may be arranged for carrying out the process diagrammatically indicated in Figure 3. The air is introduced into tower 25 through an inlet 20 and passes upwardly through an opening 21 through a sump 22, the opening 21 being protected by a cover 23. Above the sump 22 is a chamber 24 within the tower 25; and hurdles 26 are arranged in the chamber 24. Sprays 26a are arranged to spray liquid over the hurdles 26. Above the chamber 24 is another chamber 27, which is separated from the chamber 24 by a sump 28, through which there is an opening 29 protected by a cover 30. Sprays 31 are arranged to spray liquid over the hurdles 32 arranged in the chamber 27. A chamber 33 above the chamber 27 is separated therefrom by a sump 34. An opening 35 extends through the sump 34 and is protected by a cover 36. Hurdles 37 are arranged in the chamber 33 beneath sprays 38. A middle chamber 39 is separated from the chamber 33 by a sump 40 which is provided with an opening 41 protected by cover 42. Sprays 43 are arranged to spray liquid over hurdles 44 arranged in the chamber 39. Above the sprays 43 is arranged another set of hurdles 46 over which liquid may be sprayed from sprays 47. Above the hurdles 46 is arranged another set of hurdles 48 over which sprays 49 may spray liquid. It may be found desirable to substitute a different type of contact surfaces for the ones shown as hurdles 48 and 32. The quantity of liquid is quite small compared with the volume of air employed, and, accordingly, apparatus to bring about suitable scrubbing of the air by the small quantity of liquid should be used.

Hurdles 50 have been indicated above the spray 49. This figure is diagrammatic; and those skilled in the art will know what apparatus to employ for accomplishing the desired results. Accordingly, it is to be understood that a shot tower or a tower or scrubber of the Feld type could be used at 50 and 26.

Sprays 51 are indicated as spraying liquid over the hurdles 50.

The wash oil which has been used to scrub the fuel gas is piped to the sprays 43 through a pipe 53. Liquid which has passed over the hurdles 44 is permitted to return through the pipe 54 at the same rate of flow as the flow inwardly through the pipe 53. For controlling this discharge, a valve 55 is employed. A branch pipe 56 permits flow of a portion of the liquid accumulating in the sump 40 to the sprays 38, such flow being controlled by valve 57. The liquid accumulating in the sump 34 is divided, a portion of it flowing past the valve 59 and through the pipe 60 to a pump 61, which forces this liquid upwardly through the pipe 62 to the sprays 47. The remainder of the liquid from the sump 34 is permitted by a valve 63 to flow through a pipe 64 to the sprays 31. The liquid accumulating in the sump 28 is divided; and a portion thereof is permitted by a valve 65 to be pumped by a pump 66 through a pipe 67 to the sprays 49. The remainder of this liquid is permitted by valve 68 to flow through a pipe 69 to the sprays 27. The liquid accumulating in the sump 22 is pumped by pump 70 through a pipe 71 to the sprays 51.

It will be apparent that by means of my process for treating wash oil or a liquid containing a plurality of volatile constituents, I am able to remove either the most volatile constituent or a plurality of the more volatile constituents without losing any substantial quantity of the less volatile constituents. It is, furthermore, apparent that I am able to carry on this process without heating either the wash oil or the gas which is used for the convective distillation. It will, furthermore, be apparent that I may treat a gas in successive stages with regulated quantities of a liquid in such a way as to permit the most volatile or a plurality of the more volatile constituents in the gas to remain in the gas while removing the less volatile constituents.

While I have described and diagrammatically illustrated two arrangements for carrying out the principles of my invention, it will be understood that the invention is not restricted to the apparatus shown and that the steps of the process may be variously modified within the contemplation of the invention and under the scope of the following claims.

I claim:

1. A process for removing the more volatile fraction of a plurality of volatile constituents from a liquid containing these constituents comprising treating the liquid with a gas to remove at least a portion of the more volatile fraction, and then treating said gas according to the counter-current principle with a predetermined volume of a liquid substantially free from the less volatile fraction, the predetermined volume of said last mentioned liquid being sufficient to absorb substantially all of said less volatile fraction from the gas, but insufficient to absorb all of said more volatile fraction.

2. A process for removing the more volatile fraction of a plurality of volatile constituents from a liquid containing these constituents, comprising treating the liquid with a gas to remove at least a portion of the more volatile fraction, treating a predetermined volume of the liquid to remove substantially all of the less volatile fraction, and then treating said gas according to the counter-current principle with said predetermined volume of liquid, the predetermined volume last mentioned being sufficient to absorb substantially all of said less volatile fraction from the gas, but insufficient to absorb all of said more volatile fraction.

3. A process for removing the more volatile fraction of a plurality of volatile constituents from a liquid containing these constituents, comprising treating the liquid with a gas to remove at least a portion of the more volatile fraction, treating a predetermined volume of the liquid to remove substantially all of the less volatile fraction, then treating said gas according to the counter-current principle with said predetermined volume of liquid, the predetermined volume last mentioned being sufficient to absorb substantially all of said less volatile fraction from the gas, but insufficient to absorb all of said more volatile fraction, and commingling said predetermined volume of liquid with the liquid containing the volatile constituents so as to be treated therewith in the first-mentioned step of the process.

4. A cyclical process for removing the more volatile fraction of a plurality of volatile constituents from a liquid containing these constituents comprising treating the liquid with a gas to remove at least a portion of the more volatile fraction, treating a predetermined volume of the liquid with the last mentioned gas prior to employing the same in the first mentioned step of the process for treatment of the said liquid, and treating the gas after being employed in the first mentioned step of the process according to the counter-current principle with said predetermined volume of treated liquid, the predetermined volume last mentioned being sufficient to absorb substantially all of the less volatile fraction from the gas, but insufficient to absorb all of the more volatile fraction.

5. A process for removing the most volatile of a plurality of volatile constituents from a liquid containing these constituents comprising enriching a gas with the vapors of the less volatile constituent or constituents, treating said liquid with the gas thus enriched and then passing the said gas according to the counter-current principle in contact with a plurality of predetermined volumes of liquid respectively free from the less volatile constituents, the predetermined volume in each case being sufficient to absorb substantially all of the respective less volatile constituent of the gas, but insufficient to absorb all of the most volatile constituent.

6. A process for removing the more volatile fraction of a plurality of volatile constituents from a liquid containing these constituents comprising passing a gas according to the counter-current principle in contact with a predetermined quantity of the liquid from which the more volatile fraction has been removed in another step of the process, thereby enriching the gas with the less volatile fraction, treating the liquid containing said volatile constituents with said enriched gas to remove the more volatile fraction, and then treating said gas according to the counter-current principle with the liquid used in the first mentioned step of the process, the predetermined volume of liquid used in the first and third mentioned steps of the process being sufficient to absorb substantially all of the less volatile fraction in the third mentioned step of the process, but insufficient to absorb all of the more volatile fraction.

7. A process for selectively removing carbon bisulphide from wash-oil containing carbon bisulphide and a less volatile substance comprising treating the liquid with a gas to remove at least a portion of the carbon bisulphide, and then treating said gas according to the counter-current principle with a predetermined volume of wash-oil substantially free from said less volatile substance, the predetermined volume of wash oil being sufficient to absorb substantially all of said less volatile substance from the gas but insufficient to absorb all of the carbon bisulphide.

8. A process of removing carbon bisulphide from a wash-oil containing carbon bisulphide and a less volatile substance, comprising treating the wash-oil with a gas to remove at least a portion of the carbon bisulphide, treating a predetermined volume of the wash-oil to remove substantially all of said less volatile substance and then treating said gas according to the counter-current principle with said predetermined volume of wash oil, the predetermined volume last mentioned being sufficient to absorb substantially all of said less volatile substance from the gas but insufficient to absorb all of the carbon bisulphide.

9. A process of removing carbon bisulphide from a wash oil containing carbon bisulphide and a less volatile substance, comprising treating the wash-oil with a gas to remove at least a portion of the carbon bisulphide, treating a predetermined volume of the wash-oil to remove substantially all of said less volatile substance, then treating said gas according to the counter-current principle with said predetermined volume of wash oil, the pre-determined volume last mentioned being sufficient to absorb substantially all of said less volatile substance from the gas but insufficient to absorb all of the carbon bisulphide, and commingling said predetermined volume of wash oil with the wash oil containing carbon bisulphide so as to be treated therewith in the first mentioned step of the process.

10. A cyclical process for removing carbon bisulphide from wash-oil containing carbon bisulphide and a less volatile constituent comprising treating the wash oil with a gas to remove at least a portion of the carbon bisulphide, treating a predetermined volume of the wash oil with the last mentioned gas prior to use of the gas in the first mentioned step, and treating the gas used in the first-mentioned step according to the counter-current principle with said predetermined volume of wash oil, the predetermined volume last mentioned being sufficient to absorb substantially all of said less volatile constituent from the gas but insufficient to absorb all of the carbon bisulphide.

11. A process for removing the most volatile or a plurality of the more volatile constituents from a liquid containing volatile constituents comprising subjecting the liquid to convective distillation by a gas, and circulating a liquid for enriching said gas in a stage preliminary to the convective distillation with the volatile constituents to remain and for scrubbing the circulated liquid in a stage subsequent to the convective distillation, the enriching being performed progressively and the scrubbing being performed correspondingly progressively, whereby the same quantity of circulated liquid is employed for enriching with a certain volatile constituent as is used for subsequently scrubbing from the gas the same volatile constituent.

12. A process for removing the most volatile or a plurality of the more volatile constituents from liquid containing these constituents, comprising subjecting the liquid to convective distillation by a gas, and then successively scrubbing the gas with regulated quantities of wash oil, the successive quantities being substantially free progressively from the volatile constituents which are to remain, starting with the most volatile thereof, the quantities used for scrubbing being so regulated that, while sufficient to progressively remove substantially all of the volatile constituents which are to remain in the liquid, the sum of the said quantities is insufficient to remove all of the volatile constituent or constituents not to remain.

13. A process for removing the most volatile or a plurality of the more volatile constituents from a liquid containing these constituents, comprising subjecting the liquid to convective distillation by a gas which has previously been enriched with the volatile constituents which are to remain in the liquid and then successively scrubbing the gas with regulated quantities of wash oil, the successive quantities being susbtantially free progressively from the volatile constituents which are to remain, starting with the most volatile thereof, the quantities used for scrubbing being so regulated that, while sufficient to progressively remove substantially all of the volatile constituents which are to remain in the liquid, the sum of the said quantities is insufficient to remove all of the volatile constituent or constituents not to remain.

14. The process for removing the most volatile or a plurality of the more volatile constituents from a liquid containing these constituents, comprising subjecting the liquid to convective distillaton by a gas, and circulating wash oil according to the counter-current principle to scrub the gas after it has been employed for the convective distillation and to enrich the gas prior to the convective distillation step with the volatile constituents which are to remain in the liquid, the scrubbing and enriching steps forming a cycle, the scrubbing of the gas being performed by successively scrubbing the gas with regulated quantities of wash oil, the successive quantities being substantially free progressively from the volatile constituents which are to remain, starting with the most volatile thereof, the quantities used for scrubbing being so regulated that while sufficient to progressively remove substantially all of the volatile constituents which are to remain in the liquid, the sum of the said quantities is insufficient to remove all of the volatile constituent or constituents not to remain.

15. A process for removing the least volatile or a plurality of the less volatile constituents from a gas containing these constituents comprising successively scrubbing the gas with regulated quantities of wash oil, the successive quantities being substantially free progressively from the volatile constituents which are to be removed, starting with the most volatile thereof, the quantities used for scrubbing being so regulated that, while sufficient to progressively remove substantially all of the volatile constituents which are to be removed, the sum of the said quantities is insufficient to remove all of the volatile constituent or constituents not to remain.

16. A process for removing the more volatile fraction of a plurality of vapors from fuel gas comprising washing the fuel gas with an absorbent liquid, treating the liquid with a gas to remove at least a portion of the more volatile fraction, and then recovering from the treating gas substantially all of the less volatile fraction taken out of the liquid by the treating gas by washing the treating gas with a quantity of wash liquid insufficient to completely wash the more volatile fraction from the treating gas.

17. A process for removing the more volatile fraction of a plurality of vapors from fuel gas comprising washing the fuel gas with wash oil, treating the wash oil with a gas to remove at least a portion of the more volatile fraction, treating a predetermined volume of the wash oil to remove substantially all of the less volatile fraction and then treating said gas according to the counter-current principle with said predetermined volume of liquid, the predetermined volume last mentioned being sufficient to absorb substantially all of said less volatile fraction from the gas, but insufficient to absorb all of said more volatile fraction.

18. A process for removing the more volatile fraction of a plurality of vapors from fuel gas comprising washing the fuel gas with wash oil and treating the wash oil with a gas according to a cyclical process so as to remove at least a portion of the more volatile fraction, said cyclical process comprising the steps of treating the wash oil with a gas to remove at least a portion of the more volatile fraction, treating a predetermined volume of the wash oil with the last mentioned gas prior to employing the same in the first mentioned step of the cyclical process for treatment of the said wash oil, and treating the gas after being employed in the first mentioned step of the cyclical process according to the counter-current principle with said predetermined volume of treated liquid, the predetermined volume last mentioned being sufficient to absorb substantially all of the less volatile fraction from the gas but insufficient to absorb all of the more volatile fraction.

19. A process for removing the more volatile fraction of a plurality of vapors from fuel gas comprising washing the fuel gas with wash oil, subjecting the wash oil to convective distillation by a gas, and circulating wash oil for enriching said gas in a stage preliminary to the convective distillation with the less volatile fraction to be left in the oil, and for scrubbing the circulated wash oil in a stage subsequent to the convective distillation, the enriching being performed progressively and the scrubbing being performed correspondingly progressively, whereby the same quantity of circulated wash oil is employed for enriching with a certain volatile constituent as is used for subsequently scrubbing from the gas the same volatile constituent.

20. A process for removing the more volatile fraction of a plurality of vapors from fuel gas comprising washing the fuel gas with wash oil, subjecting the wash oil to convective distillation by a gas and then successively scrubbing the gas with regulated quantities of wash oil, these successive quantities being substantially free progressively from the volatile fraction which is to remain, starting with the most volatile constituent thereof, the quantites used for scrubbing being so regulated that while sufficient to progressively remove substantially all of the volatile fraction which is to remain in the wash oil, the sum of the said quantities is insufficient to remove all of the volatile fraction not to remain.

21. A process for removing the more volatile fraction of a plurality of vapors from fuel gas comprising washing the fuel gas with wash oil, subjecting the wash oil to convective distillation by a gas and circulating wash oil according to the counter-current principle to scrub the gas after it has been employed for the convective distillation, and to enrich the gas prior to the convective distillation step with the volatile constituents which are to remain in the wash oil, the scrubbing and enriching steps forming a cycle, the scrubbing of the gas being performed by successively scrubbing the gas with regulated quantities of wash oil, the successive quantities being substantially free progressively from the volatile constituents which are to remain, starting with the most volatile thereof, the quantities used for scrubbing being so regulated that while sufficient to progressively remove substantially all of the volatile constituents which are to remain in the liquid, the sum of the said quantities is insufficient to remove all of the volatile fraction not to remain.

22. A process for removing the more volatile fraction of a plurality of vapors from fuel gas comprising washing the fuel gas with wash oil, treating the wash oil with a gaseous convection medium to remove a portion or all of the more volatile fraction, and circulating wash oil according to the counter-current principle to scrub the gaseous convection medium used for treating the wash oil, the scrubbing of the gaseous convection medium being performed by successively scrubbing the gaseous convention medium with regulated quantites of wash oil, the successive quantities being substantially free progressively from the volatile constituents which are to remain, starting with the most volatile thereof.

In testimony whereof I have hereunto set my hand.

MARK SHOELD.